United States Patent Office 3,193,330
Patented July 6, 1965

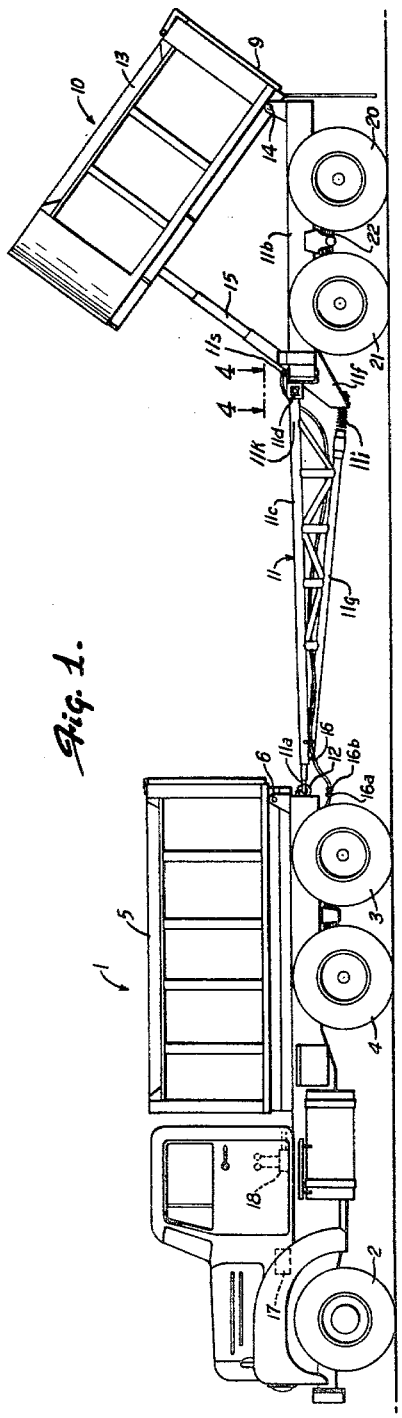
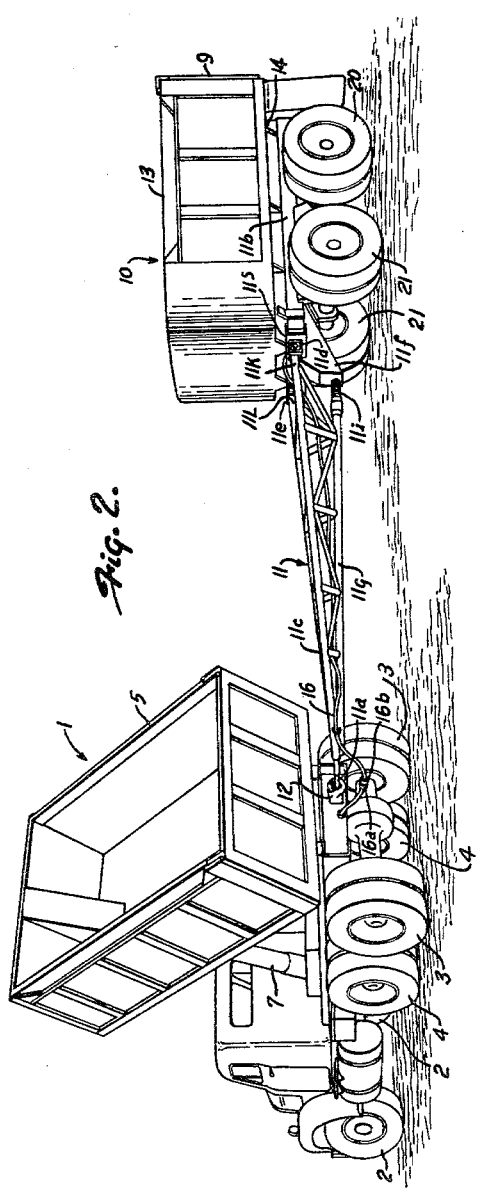

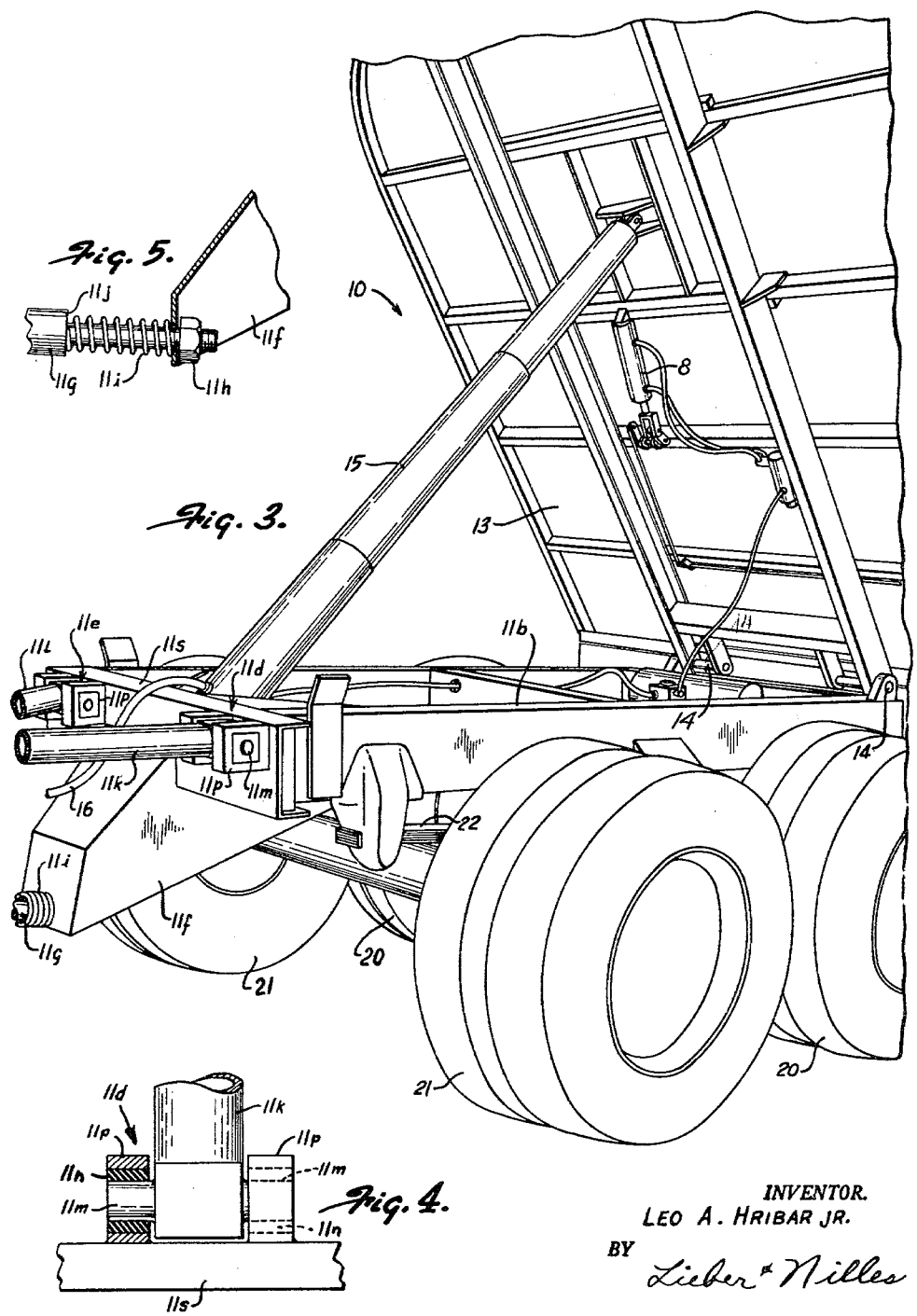

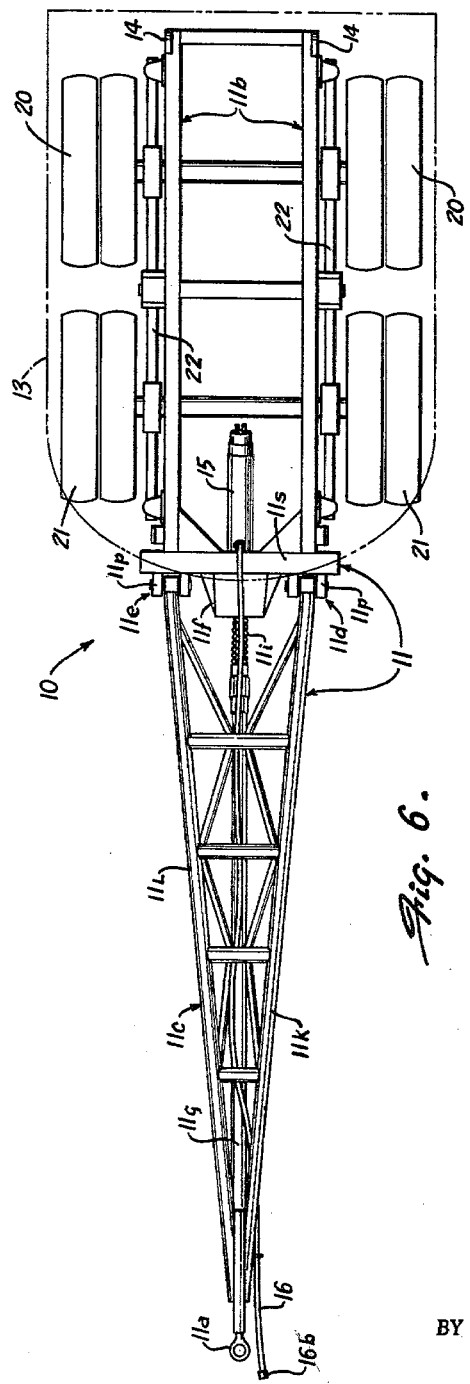

3,193,330
DUMP TRAILER
Leo A. Hribar, Jr., Rte. 1, P.O. Box 70, Caledonia, Wis.
Original application Apr. 23, 1962, Ser. No. 189,542.
Divided and this application Apr. 29, 1963, Ser. No. 276,294
15 Claims. (Cl. 298—8)

This application is a divisional application of my co-pending application Serial Number 189,542, filed April 23, 1962.

This invention relates to "on-the-road" equipment which is capable of transporting material at high speeds along the highways, and then dumping it at a desired location. This type of equipment is often used for hauling gravel or the like and then dumping it into stockpiles or spreading it over an area.

The axle loading on equipment of this character is important because of the laws of the various states which are designed to prevent damage to the highways due to excessive and concentrated pressures thereon. From the truckers' standpoint, it is desirable to be able to transport the maximum allowable load not only with the most economical and inexpensive equipment, but also with equipment which (1) can be easily handled, particularly when backing up; (2) can reach locations that are restricted in ground area and/or overhead dimensions; and (3) is flexible in its operation and number and type of functions to be performed.

Accordingly, the present invention provides improved equipment of the aobve type which meets the legal requirements of many States and provides the desirable advantages and objects referred to.

More specifically, the present invention provides a dump trailer for use with a dump truck wherein the weight is distributed to permit transport of the maximum allowable load, the combination can be readily backed up as a unit for dumping, it can discharge its load in restricted areas or in buildings of relatively low height, and the trailer can be quickly unhitched for certain types of unloading operations or left attached and simply jack-knifed out of the way for other unloading operations such as stockpiling.

The invention furthermore provides an improved dump trailer including an elongated main frame, which is rigid in a horizontal direction, and which has a relatively short (in comparison to the main frame) dump body pivoted at the rear end thereof. This trailer has two pairs of closely coupled and non-steerable wheels directly under the dump body which provide sufficient load-carrying capacity and permit the unit to be backed up and easily controlled as to direction while doing so.

These and other objects and advantages of the present invention will appear hereinafter as this disclosure progresses, reference being had to the accompanying drawings, in which:

FIGURE 1 is a side elevational view of a truck and dump-trailer combination in accordance with the present invention;

FIGURE 2 is a perspective view of the combination shown in FIGURE 1, but showing the trailer jackknifed out of the way and the truck body in the dump position;

FIGURE 3 is an enlarged, fragmentary, perspective view of the trailer dump body in the elevated position;

FIGURE 4 is a fragmentary view taken generally from line 4—4 in FIGURE 1 but on an enlarged scale and showing a rubber shock connection, certain parts being shown in section or broken away for clarity;

FIGURE 5 is a vertical sectional view, on an enlarged scale, of the adjustable spring connection in the trailer frame; and FIGURE 6 is a plan view of the trailer shown in FIGURES 1 and 2, but on an enlarged scale, and showing the dump-body in broken lines for clarity.

Referring more specifically to the drawings, a dump truck 1 is provided having a pair of front steerable wheels 2, a pair of rear, load carrying dual wheeln 3 and a forward pair of rear, load carrying dual wheels 4. The truck also includes a dump body 5 which is elevatable about its point of pivotal connection 6 to the truck frame by means of the single-acting cylinder 7 which is located between the truck frame and the dump body.

The improved dump trailer 10 includes a longitudinal and relatively long (in comparison to the dump body to be described) main and rigid frame 11 which is secured by its large eye 11a at its front end to the quick-detachable hitch 12 at the rear end of the truck frame. This hitch may in itself be of conventional character, such as, for example, a Western Unit air lock type of hitch which can be uncoupled in a fraction of a minute.

The rigid frame 11 is shown as comprised of a generally rectangular in plan, rear or body frame 11b and a forward tongue frame 11c. These frames 11b and 11c may be formed as one rigid piece or alternatively as shown in the drawings these frames may be rigidly fastened together, but in addition may have resilient "shocks" 11d and 11e therebetween and also an adjustable spring connection to be later described. In either event, it should be noted that the trailer frame 11 is rigid in that no vertical pivot axis is provided intermediate the length of the frame, although pivoting about a horizontal axis may be provided.

The trailer also includes a dump body 13 which is pivoted at 14 to the frame 11. A single-acting cylinder 15 interposed between the frame 11 and the dump body 13 provides the necessary power to tilt the body for dumping thereof. More specifically, the lower end of the cylinder 15 is pivotally mounted in a forwardly and downwardly extending frame portion 11f through which the lower strut 11g extends and is adjustably and resiliently attached by the adjusting nut 11h threaded on the end of the strut and a spring 11i interposed between a shoulder 11j on the strut and the frame portion 11f.

The struts 11g, 11k, and 11L form frame 11c of a triangular pyramid shape. In any event, the frame 11c has laterally transversely spaced points of connection with the rear portion 11b and also has vertically spaced points of connection with frame 11b of the entire frame 11.

By so positioning the cylinder, it nests compactly beneath the dump body when the latter is lowered, and yet assumes a good leverage position (as shown in FIGURES 1 and 3) when raising the dump body.

A fluid pressure conduit 16 conducts pressure fluid between a pump 17 located in the truck and cylinder 15; quick-connect coupling parts 16a and 16b (FIGURE 1) are provided to permit rapid "breaking" of the conduit 16 for trailer separation from the truck. The coupling parts are conventional, and part 16a is simply a female socket carried on the truck, while part 16b is a complementary male member.

Another cylinder 8 (FIGURE 3) operates the rear door 9 of the body but forms no part per se of the present invention.

If the rubber shocks and adjustable spring connection above mentioned are to be used, the tongue frame 11c is capable of slight vertical movement relative to the body frame 11b to accommodate undulating terrain, although such is not always necessary. The nut can be adjusted to vertically swing the front end of the frame 11c to thereby accommodate trucks having hitch hooks of different heights from the ground. The spring froms a resilient cushion to permit vertical swinging of the tongue frame relative to the body frame 11b.

The rubber shocks 11d and 11e are formed as follows. The rear ends of upper struts 11k and 11l each have a pair of laterally projecting lugs 11m which are inserted in rubber collars or blocks 11n. These rubber blocks in turn are rigidly held in their brackets 11p, and the pairs of brackets are welded to the cross member 11s of frame 11b.

A three-way transfer valve 18 located in the cab enables the operator to direct pressure fluid from the pump to either the cylinder 7 or the cylinder 15 to thereby dump, respectively, either the truck body 5 or the trailer body 13. The dump bodies are returned to their normal position by gravity.

It will be noted that the trailer body is of a rather compact design, that is to say, it is relatively short. In this respect, a length of 12 feet has been found to be the maximum, practical length of a unit made in accordance with the present invention, as will more fully appear.

The dump trailer also includes two pairs 20 and 21 of load supporting dual wheels, and it should be noted that these pairs are closely coupled together in a longitudinal direction. In this respect, it has been found most advantageous to maintain a front and rear spread between these pairs of wheels in the neighborhood of 4 feet between centers. A greater spread, on the order of 6 feet, could be utilized, but in order to prevent excessive wear on the tires, a short spread is desirable. In other words, as these wheels are the non-steerable type, when making a turn less sliding of the rubber on the ground results if the wheels are closely coupled together. The wheels may be fastened to the trailer body by conventional leaf spring means 22.

As previously indicated, the dump trailer wheels of the present invention are of the non-steerable type, and with this arrangement the trailer can be easily backed up and more positively controlled. This ease of control is furthermore possible because of the fact that the long frame 11 is a single, laterally rigid unit, and the dump body frame is not pivoted independently relative to the tongue frame 11, in a horizontal direction. That is to say no horizontal swinging takes place between the parts of the trailer frame.

The load supporting wheels 20 and 21 are located directly and generally centrally under the dump body 13.

Reference will now be made to certain dimensions of the various parts and relative distances therebetween, which results in an economically produced and efficient unit capable of carrying the maximum load allowable by a majority of the laws of the various States. Reference will be made to certain laws and regulations, it being understood that they are offered by way of example only, and a complete summary thereof would not serve any useful purpose as far as this disclosure is concerned.

Certain State laws require a distance of 30 feet between the wheels 4 of the truck and the wheels 20 of the trailer in order that a maximum load of 64,000 lbs. can be carried by the combined unit. If this distance is diminished by one foot, the maximum load allowable would be reduced by 800 lbs.

Additionally, certain State laws require a distance between the truck body 5 and the forward edge of the frame for the trailer body to be from 15 to 16½ feet, generally speaking. In addition, a distance of at least 42 to 51 feet, for some States, between the front wheels 2 of the truck and the rear wheels 20 of the trailer must be maintained in order that the maximum weight allowable can be carried.

These laws generally have the effect of distributing the load over a considerable portion of the highway and thereby reduce the concentrated load in any one area, and are commonly referred to as the "Bridge Laws" and vary somewhat from State to State.

In view of the above requirements, the present arrangement has been provided wherein a relatively short (in comparison to the rigid frame 11c) dump body is pivotally positioned on a laterally rigid trailer frame and two pairs of non-steerable, load supporting wheels are located directly under the dump body. The result is a length of approximately 30 feet between the front set of rear wheels 4 of the truck and the rear pair of wheels 20 of the trailer body, and a considerably long frame is provided between the dump body of the truck and the dump body of the trailer. Stated otherwise, a considerable distance is provided between the dump bodies.

It will be noted that the distance between the dump bodies 5 and 13 is greater than the length of the dump body 13. In other words, the length of dump body 13 is not more than one-half the length of the entire trailer frame.

With the above arrangement, a combination truck-trailer is provided which can carry the maximum allowable load and because of the rigid trailer frame and non-steerable wheels the trailer can be readily backed up and easily controlled while doing so. This permits the operator to rapidly deliver the trailer to the area at which the load is to be dumped. When the trailer has been so positioned, the operator elevates the trailer body 13 and dumps the load, as shown in FIGURE 1. Then, in order to empty the dump body 5 of the truck in the same location, it is only necessary for the operator to pull the trailer forwardly a distance, again reverse the truck, but this time simultaneously jackknifing the trailer out of the way (as shown in FIGURE 2), while the truck itself moves into the dump area. By means of the relatively long tongue frame, in comparison to the trailer body 10, the trailer is swung a considerable distance to one side, that is, through a considerable arc of swing, and thereby facilitates jackknifing of the trailer and backing of the truck without sidewise movement or skidding of the trailer occurring, and also there is no interference between the trailer body and the rear end of the truck. Thus it is unnecessary to unhitch the trailer from the truck when stockpiling, for example. This is possible only because the trailer frame is rigid and does not contain a pivoted joint, and furthermore because of the fact that the support wheels 20 and 21 do not pivot but instead are non-steerable. Furthermore, in order for them to be non-steerable, from a practical standpoint, they are closely coupled together with a minimum amount of spread and are located directly under the weight imposed by the loaded trailer.

If space requirements prevent jackknifing of the trailer in order to dump the truck, it is an easy matter to quickly disconnect the trailer after it has been emptied and pulled from the dump site, and then back the truck itself into the dumping area. All of this can be accomplished in a very short time.

During a spreading operation, as contrasted from stockpiling, it is unnecessary to disconnect the trailer. Instead the trailer can be pulled along slowly in the elevated position to lay down or spread the gravel or the like, and when that supply is exhausted, the dump body of the truck is elevated to likewise perform a spreading function. In the latter instance, the trailer is simply trailed behind the truck and is pulled over the material being laid down by the truck.

This stockpiling or spreading can also be accomplished within a building of relatively low height, and this is possible because both the truck body and the trailer body are of relatively short length. By having a relatively short length trailer, not only can dumping be performed within a low building, but lateral stability is no problem, as it would be in the case of a longer trailer. In other words, it has been proposed to dump from a semi-trailer type of tractor-trailer equipment, but this has proved unsatisfactory, because in order to provide a unit capable of carrying the maximum allowable load, it would be necessary to have a trailer of considerable length, due to the wheel spacing requirements. When such a trailer is in the elevated position, it is not laterally stable and also requires excessive overhead clearance in order to perform the dumping operation.

With the present arrangement, including the long and rigid trailer frame and the short trailer dump body, a truck-trailer combination has been provided which is capable of carrying the maximum load allowable, and the trailer can be readily backed up and controlled by the truck operator because of the rigid frame and the non-steerable supporting wheels. The relatively short dump body of the trailer insures lateral stability when dumping, provides the ability to dump in a restricted height situation, and also insures sufficient clearance between the truck body and the trailer dump body so as to comply with distance requirements of the various States.

The operator can dump either the truck body or the trailer body from his position in the cab, and when stockpiling it is unnecessary to unhitch the trailer in order to dump both of the bodies in the same location.

A highly flexible and easily handled combination has been provided which is economical to produce and capable of efficiently performing the functions for which it was designed.

Various modes of carrying out the invention are contemplated as being within the scope of the following claims particularly pointing out and distinctly claiming the subject matter which is regarded as the invention.

I claim:

1. An on-the-road dump trailer comprising, an elongated and laterally rigid main frame having a front end and a rear end, said main frame including a tongue frame having laterally spaced apart struts, said tongue frame converging in both height and width towards said front end and terminating in a narrow front end, means on said front end for quick attachment to the rear end of a dump truck, a dump-body attached to said main frame, the length of said tongue frame being greater than one-half the length of said main frame, and a pair of wheels located on each side of and directly supporting said main frame, said pair of wheels being positioned in tandem and adjacent one another.

2. An on-the-road dump trailer comprising, an elongated and laterally rigid main frame having a front end and a rear end, said main frame including a tongue frame having laterally spaced apart struts, said tongue frame converging in both height and width towards said front end and terminating in a narrow front end, means on said front end for quick attachmet to the rear end of a dump truck, a dump-body pivotally attached to said main frame adjacent the rear end thereof, the length of said tongue frame being greater than one-half the length of said main frame, and a pair of wheels located on each side of and directly supporting said main frame, said pair of wheels being non-steerable and positioned in tandem and adjacent one another.

3. An on-the-road dump trailer comprising, an elongated and laterally rigid main frame having a front end and a rear end, said main frame including a tongue frame having laterally spaced apart struts, said tongue frame converging in both height and width towards said front end and terminating in a narrow front end, means on said front end for quick attachment to the rear end of a dump truck, a dump-body attached to said main frame, the distance between said body and said front end of said main frame being greater than one-half the length of said main frame, and a pair of wheels located on each side of and directly supporting said main frame, said pair of wheels being positioned in tandem and adjacent one another.

4. An on-the-road dump trailer comprising, an elongated and laterally rigid main frame having a front end and a rear end, said main frame including a tongue frame having laterally spaced apart struts, said tongue frame converging in both height and width towards said front end and terminating in a narrow front end, means on said front end for quick attachment to the rear end of a dump truck, a dump-body pivotally attached to said main frame adjacent the rear end thereof, the distance between said body and said front end of said main frame being greater than one-half the length of said main frame, and a pair of wheels located on each side of and directly supporting said main frame, said pair of wheels being non-steerable and positioned in tandem and adjacent one another.

5. A trailer as defined in claim 4 further characterized in that said tongue frame includes vertically and laterally spaced struts which converge towards said front end.

6. A trailer as defined in claim 4 including means at the rear end of said tongue frame for permitting limited vertical swinging movement of said tongue frame relative to the rest of said main frame.

7. A trailer as defined in claim 4 further characterized in that said wheels are spring mounted and located centrally of said body in a front and rear direction.

8. An on-the-road dump trailer comprising, an elongated and rigid main frame having a front end and a rear end, said main frame comprising a dump body frame and a tongue frame secured together and having resilient shock absorbing means therebetween, said tongue frame having vertically and laterally spaced apart struts converging to terminate in a narrow front end and having spaced apart attaching portions at their rear end for attachment to said dump body frame, means on said front end for quick attachment to the rear end of a dump truck, a dump body attached to said dump body frame, and a wheel assembly located directly under said body and supporting said main frame.

9. An on-the-road dump trailer comprising, an elongated and rigid main frame having a front end and a rear end, said main frame comprising a dump body frame and a tongue frame secured together and having resilient shock absorbing means therebetween, said tongue frame having vertically and laterally spaced apart struts converging to terminate in a narrow front end and having spaced apart attaching portions at their rear end for attachment to said dump body frame, means on said front end for quick attachment to the rear end of a dump truck, a dump body pivotally attached to said dump body frame adjacent the rear end thereof, and a non-steerable wheel assembly located directly under said body and supporting said main frame.

10. A trailer as defined in claim 21 further characterized in that the length of said body is less than the length of said tongue frame.

11. An on-the-road dump trailer comprising, an elongated and laterally rigid main frame, said main frame including a forward tongue frame and a rear dump-body frame means, said tongue frame having a pair of laterally spaced struts and a third strut vertically spaced from said pair of struts, all of said struts converging forwardly into a narrow front end, means on said front end for quick attachment to the rear end of a dump truck, the rear ends of said pair of laterally spaced struts having a resilient shock connection with said dump-body frame means, said third strut having a resilient connection with said frame means, a dump-body pivotally attached to said dump-body frame means adjacent the rear end thereof, and a non-steerable wheel assembly located directly under said dump-body frame means for support thereof.

12. A trailer as defined in claim 11 further characterized in that said third strut is located below said pair of laterally spaced struts, and said body is of a shorter length than said tongue frame.

13. An on-the-road dump trailer comprising, an elongated and laterally rigid main frame having a front end and a rear end, said main frame including a tongue frame having laterally spaced apart struts, said tongue frame converging in both height and width toward said front end and terminating in a narrow front end, means on said front end for quick attachment to the rear end of a dump truck, a dump-body pivotally attached to said main frame adjacent the rear end thereof and about a lateral axis for dumping rearwardly of said trailer, said tongue frame being of greater length than the length of said body, and spring mounted, non-steerable wheels centered in a front and rear direction under said dump-body and supporting said main frame.

14. A trailer as set forth in claim 13 further characterized in that said tongue frame includes vertically and laterally spaced struts which converge towards said front end.

15. A trailer as defined in claim 13 including means at the rear end of said tongue frame for permitting limited vertical swinging movement of said tongue frame relative to the rest of said main frame.

References Cited by the Examiner

UNITED STATES PATENTS

| | | | |
|---|---|---|---|
| 1,840,435 | 1/32 | Davis | 280—489 |
| 2,131,326 | 9/38 | Kaster | 298—20 X |
| 2,452,710 | 11/48 | Allen | 280—489 |
| 2,469,199 | 5/49 | Lewis | 298—8 |
| 2,496,350 | 2/50 | Lundell | 298—21 |
| 2,718,431 | 9/55 | Pietroroia | 298—21 |
| 2,770,490 | 11/56 | Hockensmith | 298—22 |
| 2,872,208 | 2/59 | Bennett et al. | 280—489 |
| 2,892,659 | 6/59 | Francois | 298—22 |
| 2,997,342 | 8/61 | Talbert | 298—5 X |
| 3,083,058 | 3/63 | Walstrom et al. | 298—5 |

FOREIGN PATENTS

| | | |
|---|---|---|
| 188,308 | 8/23 | Great Britain. |
| 872,010 | 3/53 | Germany. |

ARTHUR L. LA POINT, *Primary Examiner.*
LEO QUACKENBUSH, *Examiner.*